United States Patent
Dixon (10) Patent No.: US 9,629,337 B1
(45) Date of Patent: Apr. 25, 2017

(54) MECHANIZED TRAINING DEVICE

(76) Inventor: Kevin Dixon, Linden, AL (US)

(*) Notice: Subject to any disclaimer, the term of this patent is extended or adjusted under 35 U.S.C. 154(b) by 337 days.

(21) Appl. No.: 13/327,671

(22) Filed: Dec. 15, 2011

Related U.S. Application Data (60) Provisional application No. 61/459,602, filed on Dec. 16, 2010.

(51) Int. Cl.
*A01K 15/02* (2006.01)

(52) U.S. Cl.
CPC .................................. *A01K 15/02* (2013.01)

(58) Field of Classification Search
CPC .................................................. A63B 69/0068
USPC .................................. 434/219; 273/359, 369
See application file for complete search history.

(56) References Cited

U.S. PATENT DOCUMENTS

| | | | | |
|---|---|---|---|---|
| 2,613,080 A | * | 10/1952 | Dow | ............................. 273/383 |
| 3,802,706 A | * | 4/1974 | Hamm | .......................... 273/339 |
| 3,940,130 A | * | 2/1976 | Fawcett | ......................... 273/454 |
| 4,960,076 A | * | 10/1990 | Snorgrass et al. | ............. 119/839 |
| 4,995,618 A | * | 2/1991 | Panzner | ......................... 273/367 |
| 7,059,605 B1 | * | 6/2006 | Hughes | .......................... 273/369 |
| 2005/0282128 A1 | * | 12/2005 | Brinkerhoff et al. | ......... 434/247 |
| 2006/0170163 A1 | * | 8/2006 | Perkins | ......................... 273/359 |

\* cited by examiner

*Primary Examiner* — Sam Yao
*Assistant Examiner* — Alvin Carlos
(74) *Attorney, Agent, or Firm* — Karen B. Tripp (57) ABSTRACT

A device to aid developing and improving roping techniques and skills providing a roping target with four animated and articulated leg portions. The roping target is capable of moving through free space independent of the means by which the legs articulate. Embodiments of the subject invention provide a roping target that simulates the relative size of a small goat-like animal, while other embodiments simulate a relatively large calf like animal. Embodiments of the subject invention provide a novel method to vary the gate speed of the legs and/or vary the type of gate of the roping target. The invention includes safety mechanisms for use.

7 Claims, 7 Drawing Sheets

MECHANIZED TRAINING DEVICE

RELATED APPLICATION

This application claims priority from U.S. Provisional Patent Application Ser. No. 61/459,602, filed Dec. 16, 2010, the entire disclosure of which is incorporated herein by reference.

BACKGROUND OF THE INVENTION

1. Field of the Invention

The subject invention is related to the sport of rodeo, and more specifically to the specialization of Team Roping. Team Roping is a timed rodeo event that features a steer and two horse-mounted riders. Both horse-mounted riders work together as a team to rope the steer as quickly as possible. A first roper is referred to as the "header," the person who ropes the front of the steer, usually around the horns, and a second roper is the "heeler," who ropes the steer by its hind feet. Teams of professionals and amateurs compete against each other trying to achieve the best possible times.

2. Description of Relevant Art

Team Roping requires extensive training in order for competitors to develop the specialized skills necessary to compete in team roping events. Team roping competitors must continuously hone their skills in order to perform at the highest levels. Several prior art training devices exist to help team ropers to develop and/or improve appropriate skills for the sport. The subject invention improves upon these prior art training devices and provides additional novel and innovative features.

In a search of prior art relating to devices intended for roping training, the following patents were discovered and are being disclosed. U.S. Pat. Nos. 5,080,373; 5,009,432; 4,874,179; 4,662,642; 4,451,045; 7,293,775; 7,059,605; 5,709,386; and 4,981,302.

U.S. Pat. No. 5,080,373 is a roping training device featuring a system marketed under the name Slick-Stick. U.S. Pat. No. 5,009,432 is a roping training device. The '432 patent covers a device with a pair of rear legs that move together at a speed determinate with the cart it is attached thereon. U.S. Pat. No. 4,874,179 is a roping training device. The '179 patent is a stationary sled device featuring a pair of rear legs that move up and down but do not articulate relative to each other. U.S. Pat. No. 4,662,642 is a roping training device. The '642 patent depicts a sled device with elliptical wheels, designed to be towed by a second user. As the sled is towed, the wheels provide a linkage to articulate a pair of rear legs back and forth in tandem, which means the speed of articulation of the legs, is dependent upon speed of the sled. U.S. Pat. No. 4,451,045 is a roping training device. The '045 patent shows a roping stand designed for stationary use, with a motor to drive a pair of rear legs back and forth. U.S. Pat. No. 7,293,775 is a roping training device. The '775 patent is a self-propelled remote controlled cart with separately articulating tandem rear legs. U.S. Pat. No. 7,059,605 is a roping training device. The '605 patent is a stationary device with a pair of rear legs articulating back and forth in tandem. U.S. Pat. No. 5,709,386 is a roping training device. The '386 patent is a sled that is either stationary or must be towed for use. A motor articulates the rear legs in tandem.

U.S. patents '432, '642, '386 and '302 are not designed for solo use. U.S. patents '373, '179, '045, '775, and '605 can be used by a single user.

Known team roping practice devices such as those taught in these patents have limitations or present problems that the subject invention remedies. For example, one problem with known prior art devices is that the animated leg motion of the roping target does not provide speed adjustments to adequately simulate the leg motions of a steer. A further limitation of known devices is that the roping target does not include front legs, which means that there is no simulated motion of the front legs with the motion of the rear legs of the roping target. Another limitation is that multiple variations of types of leg motion for the rear legs such as hopping or skipping are not provided. Another problem is that animation means of the legs is not independent with the movement of the roping target through free space. Also limiting is the fact that the animated legs do not effectively touch the ground for any of the disclosed patents. Another limiting feature is that none are designed with a safety system to shut down in the event of a child or animal coming into contact with the target while it is in motion.

In the market place, there are a number of prior art examples of products that are offered for sale, however, each of these prior art examples also fall short of satisfactorily resolving the issues at hand and are limited in their use and/or application. Such products suffer from the same limitations as the inventions taught in the previously cited patents. These limitations include lack of speed adjustments that would adequately simulate steer leg motion, no front legs, no way to vary the "gait" of the target to something resembling the hopping or skipping of a calf or goat like animal, lack of a drive system capable of animating the legs that is independent from that which moves the target through free space, and feet that do not effectively touch the ground.

OBJECTS OF THE INVENTION

One problem with prior art roping training devices, and specifically roping training devices intended for developing skill for the heeler, is that many of the prior art devices require more than one person to use the device, and do not provide a viable method for solo use of the product.

Another even more significant problem with all of the known prior art roping training products intended for heelers is that none of them provide a realistic animation of the legs of the roping target, particularly since none of the known prior art products include the animation of the front legs in cooperation with the rear legs.

Yet another problem with all known prior art roping training products intended for heelers is that none of the products provide legs with hoofs that effectively touch the ground.

Still another problem with all known prior art roping training products intended for heelers is that none of the products provide a means of configuring the animated legs of the roping target to simulate either a hopping gate or a skipping gate.

And yet another problem with all known prior art roping training products intended for heelers is that none of the products include a drive means for the articulated legs which is independent of the drive means that moves the product through free space.

Another problem with the drive means of all known prior art roping training products intended for heelers is that none of the products provide a means of independently adjusting the relative motion speed of the roping target legs, while separately providing speed adjustment for a drive means for moving the roping target through free space.

An additional problem with all known prior art roping training products intended for heelers is that none of the products provide a safety system to shut down the device from running over a child, animal, or such that might inadvertently come into the path of the device during use.

None of the prior art referenced provides the level of realistic roping simulation featured in the subject invention. A significant shortcoming of all the prior art forms referenced is that their use promotes poorly formed skills and/or incorrect muscle memory techniques that are ultimately difficult for the user to break or change. It will be apparent to those skilled in the art that the subject invention overcomes the shortcomings and limitations of the prior art patents and/or known prior art products available on the market, and addresses the needs of the consumer in various applications.

SUMMARY OF THE INVENTION

The present invention provides a device or apparatus to aid in developing and improving roping techniques and skills, particularly for steer and calf roping rodeo events. The invention generally provides a roping target preferably in the form of an animal torso, with four animated and articulated leg portions. The roping target is capable of moving through free space independent of the means by which the legs articulate. That is, the roping target may be pulled through space as by a moving vehicle, or the roping target may be pivoted and rotated about a fixed point. The gate speed of the legs and/or the type of gate of the legs of the roping target may be varied, preferably independently, but cooperatively, and preferably randomly. The legs may effectively touch the ground and may move in a hopping gate or a skipping gate.

DETAILED DESCRIPTION OF PREFERRED EMBODIMENTS

Figure 1:
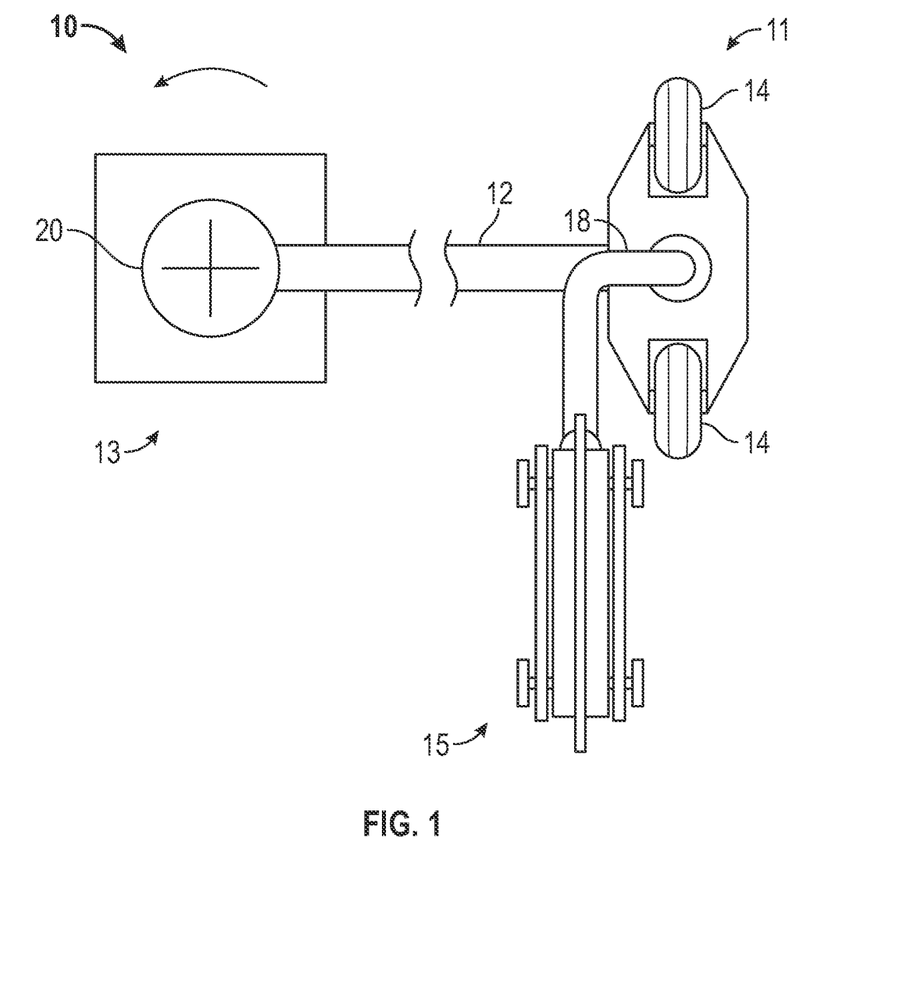
FIG. 1 is a top view of a preferred embodiment of the mechanized training device of the present invention.

FIG. 1 shows a top view of the subject invention 10 wherein a trolley 11 is disposed at the end of a radial arm 12 extended outward from a pivot 13. A motor (not shown) is adapted to the trolley 11 to drive the wheels 14 such that the trolley 11 travels in a circuitous path around the pivot. Fitted to the trolley 11 is an extension means that connects and holds a roping target 15 in place cantilevered behind the trolley. The drive means (not shown) for the trolley 11 is independently controlled for speed or rotation about the pivot 13. The roping target 15 is fitted with a pair of rear legs 16 and a pair of front legs 17 that are separately and independently articulated from the motor driving the trolley. The front legs 17 and rear legs 16 are capable of being moved back and forth in tandem or in opposition relative to each other. The legs 16 and 17 may also be configured to cross each other, such as when the front legs 17 are back and the back legs 16 are forward. Alternatively or additionally, the front legs 17 may go in between the back legs 16 and/or the back legs 16 go inside the front legs 17. The extension means 20 is fitted on the trolley 11 with a first swivel point that allows the swivel to rotate a few degrees clockwise and/or counterclockwise about the trolley 11. The roping target 15 is fitted with a second swivel means 18 about which the roping target 15 is able to rotate a few degrees clockwise and/or counterclockwise.

The trolley 11 and the radial arm 12 are designed to include a safety shut-off device (not shown) that will stop the progress of the trolley 11 about the pivot 13 should a child or animal or other obstruction come in contact with the path of the subject invention. The safety shut-off device will also shut down the articulation of the legs 16 and 17 on the roping target. The safety shut-off device also provides a complete system shut-down when the heeler ropes one or more legs of the roping target. A reset switch is provided in order to allow the trolley 11 and/or the roping target 15 to restart their respective motions.

Variations of the preferred embodiment provide additional levels of sophistication such that the speed at which the trolley rotates about the pivot is programmed to be variable so that the user must adjust to unexpected and/or unpredictable speed changes during use.

Similarly, the speed of the articulation of the rear and front legs 16 and 17 of the roping target 15 can be programmed such that a variable and unpredictable leg articulation speed is presented to the user for training purposes. A further programmable variation allows for the rear legs to switch articulation from moving in tandem with each other to an alternating back and forth position relative to each other. When both rear legs move in tandem with each other, the resulting gate represented by the roping target is considered as "hopping", as compared to the rear legs opposing each other so that when one leg swings forward while the other rear leg swings backward, simulating a "skipping" gate. All preferred embodiments feature the ability to be configured for different gates, but only higher end embodiments of the subject invention will feature a programmable switch between the different gates at random intervals to present increased levels of difficulty to the user.

Those skilled in the art will readily appreciate that the specific gear or pulley or cam arrangements are plentiful to achieve the features claimed by the subject invention. In similar fashion, the actual motor systems and/or power systems useful to achieve the features of the subject invention can be battery, electric, solar, hydraulic, pneumatic, or any combination of currently known power systems or even those not known at this time. In addition, the specific construction materials to achieve the features of the subject invention can be drawn from any of the typical materials of metal, plastic, wood, or various resilient materials, in order to best create a cost effective and/or robust device.

Those skilled in the art will also readily appreciate that the number of wheels and/or the size of the wheels 14 on the trolley 11 do not dictate the features of the subject invention, and in similar fashion, the length or specifics of the radial extension connecting the trolley to the pivot do not dictate the features of the subject invention. Additionally, the specifics of how the radial extension arm is attached to the pivot and/or the trolley are not important to the spirit of features of the subject invention.

Figure 2:
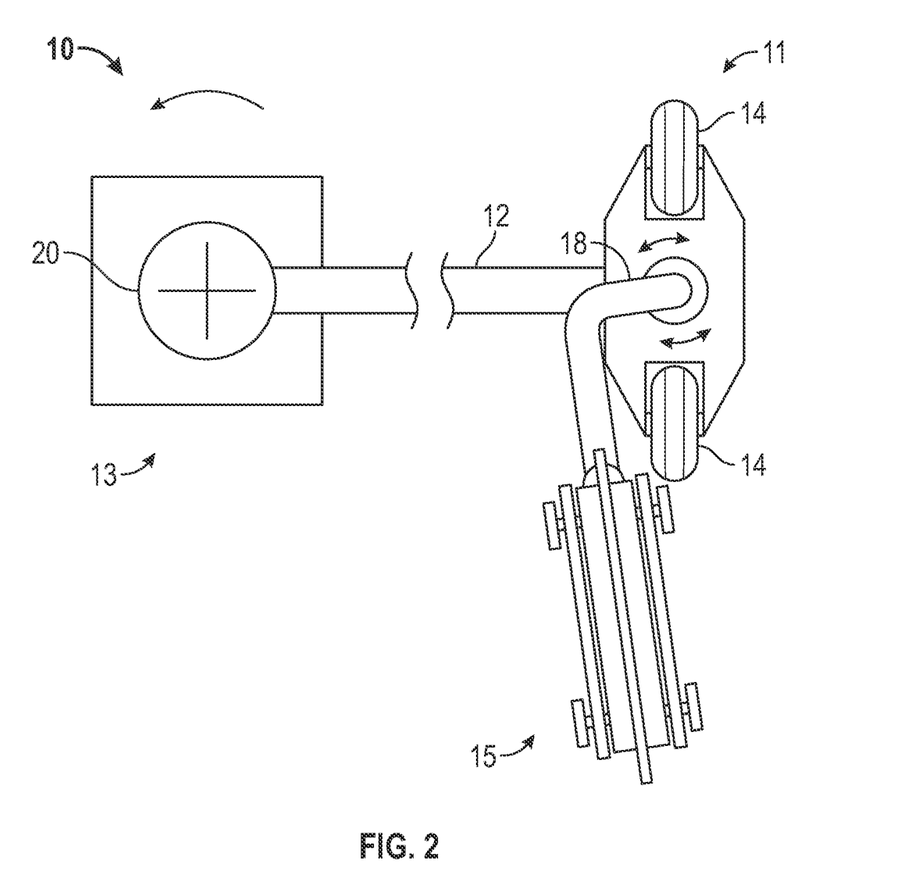
FIG. 2 is a top view of the mechanized training device of FIG. 1, showing swiveling of the trolley.

FIG. 2 shows the embodiment from FIG. 1 wherein the trolley 11 depicts how the cantilevered extension means 18 supporting the roping target 15 can swivel about the trolley 11. The swivel motion can be free movement in certain embodiments of the subject invention.

Advanced variations of the subject invention can provide random swivel motion through a programmable means. The total rotation angle to each side of the start position is an approximate maximum useful swivel of 45 degrees clockwise to approximately 45 degrees counterclockwise. Another use of the swivel means is to allow for relatively free swivel rotation upon roping the legs of the roping target and having the user to apply a minimum of resistance force to the rope tugging on the roping target, which will cause a swivel motion about the trolley, at which point a switch can be fitted to interrupt the power and shut off the entire system, requiring a reset to restart.

Figure 3:
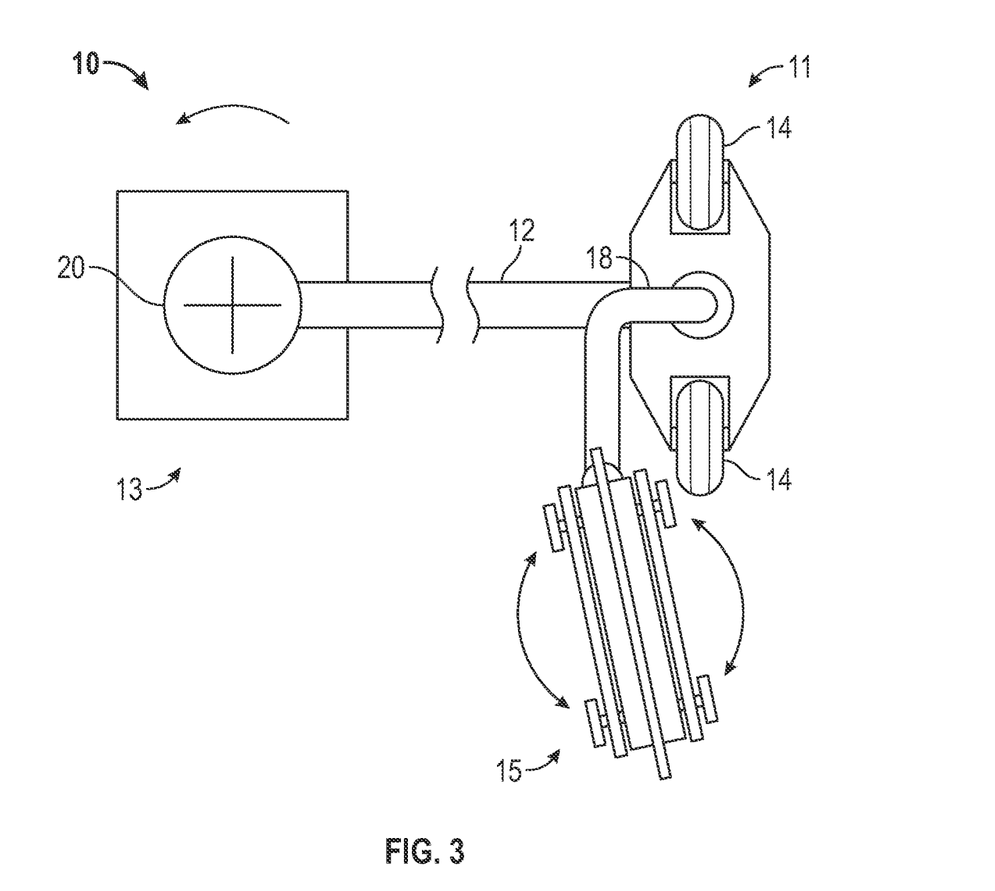
FIG. 3 is a top view of the mechanized training device of FIG. 1, showing swiveling of the target.

FIG. 3 shows the embodiment from FIG. 1 wherein the roping target 15 depicts how it can swivel about the end of the cantilevered extension means 18 supporting the roping target 15. Similar to the swivel motion described associated with FIG. 2; the roping target swivel motion can be free movement in certain embodiments of the subject invention while advanced variations of the subject invention can provide random swivel motion through a programmable means. Again, the total rotation angle to each side of the start position is an approximate maximum useful swivel of 45 degrees clockwise to approximately 45 degrees counterclockwise. Also again, another use of the swivel means is to allow for relatively free swivel rotation upon roping the legs 16 and 17 of the roping target 15 and having the user to apply a minimum of resistance force to the rope tugging on the roping target 15, which will cause a swivel motion about the trolley 11 and/or the roping target 15, at which point a switch can be fitted to interrupt the power and shut off the entire system, requiring a reset to restart.

Figure 4:
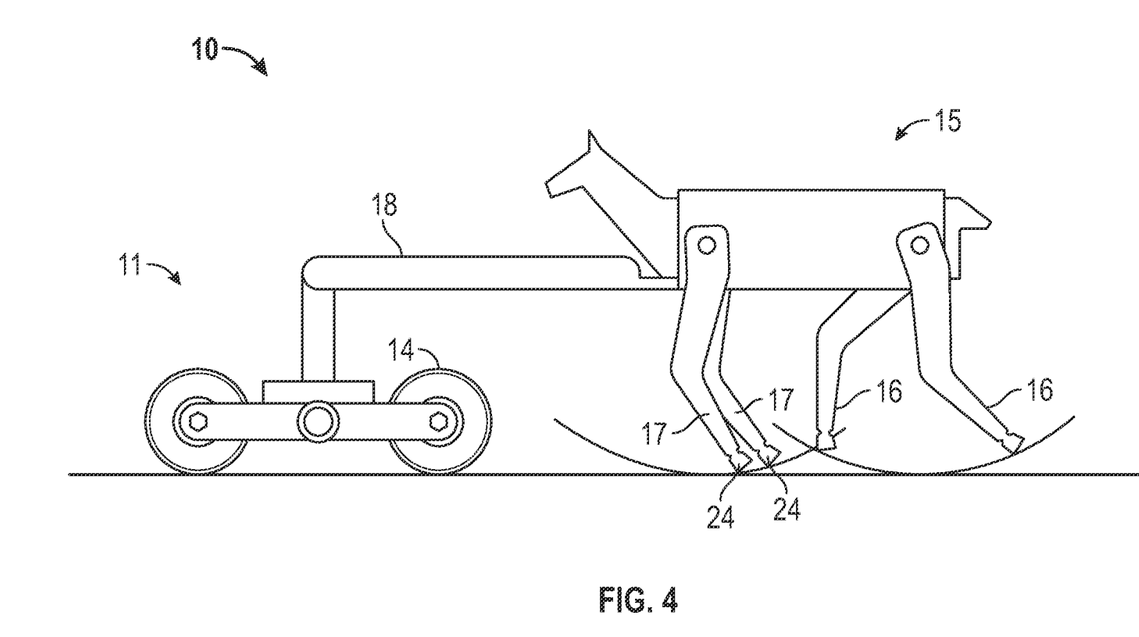
FIG. 4 is a side view of the mechanized training device of FIG. 1 having legs effectively touching the ground as they rotate about an axis connection point.

FIG. 4 shows a side view of a preferred embodiment of the subject invention wherein the trolley 11 is shown connected to the roping target 15. The roping target 15 is supported via the cantilevered extension 18 such that the legs 16 and 17 of the roping target 15 effectively touch the ground as they rotate about an axis connection point. The preferred embodiment includes a cam feature to raise the legs 16 and 17 off the ground in a vertical axis even as the legs rotate back and forth. The cam motion presents a realistic motion for the legs 16 and 17 and feet 24 of the roping target 15 to simulate a skipping and/or hopping articulation depending upon the configuration of the legs and/or programmable switching between the gates.

Those skilled in the art will readily appreciate that the relative shape and/or cosmetic appearance of the roping target resembling one kind of animal or another is irrelevant to the features and claims of the subject invention. In similar fashion, the specific shape and/or construction materials of the articulating legs are not the focus of the claims or features of the subject invention—although a preferred embodiment proposes that the legs be generally shaped to resemble an animal leg to simulate a realistic roping scenario. While not particularly necessary, one of the preferred embodiments incorporates a relatively resilient leg construction such that it is forgiving as it strikes the ground during articulated movement. One preferred embodiment of the relatively resilient legs includes an indented cross-section reduction right at the hoof portion of the leg to further facilitate little or no impediment to leg motion as the leg effectively comes in contact with the ground.

The particular gate of the rear legs depicted in FIG. 4 is "skipping" wherein one rear leg is swinging forward while the opposing rear leg is swinging backward. Preferred embodiments provide a programmable variant speed of the articulating legs while other embodiments have the capability to set the speed at a constant choice of any one of multiple speed selections.

Figure 5:
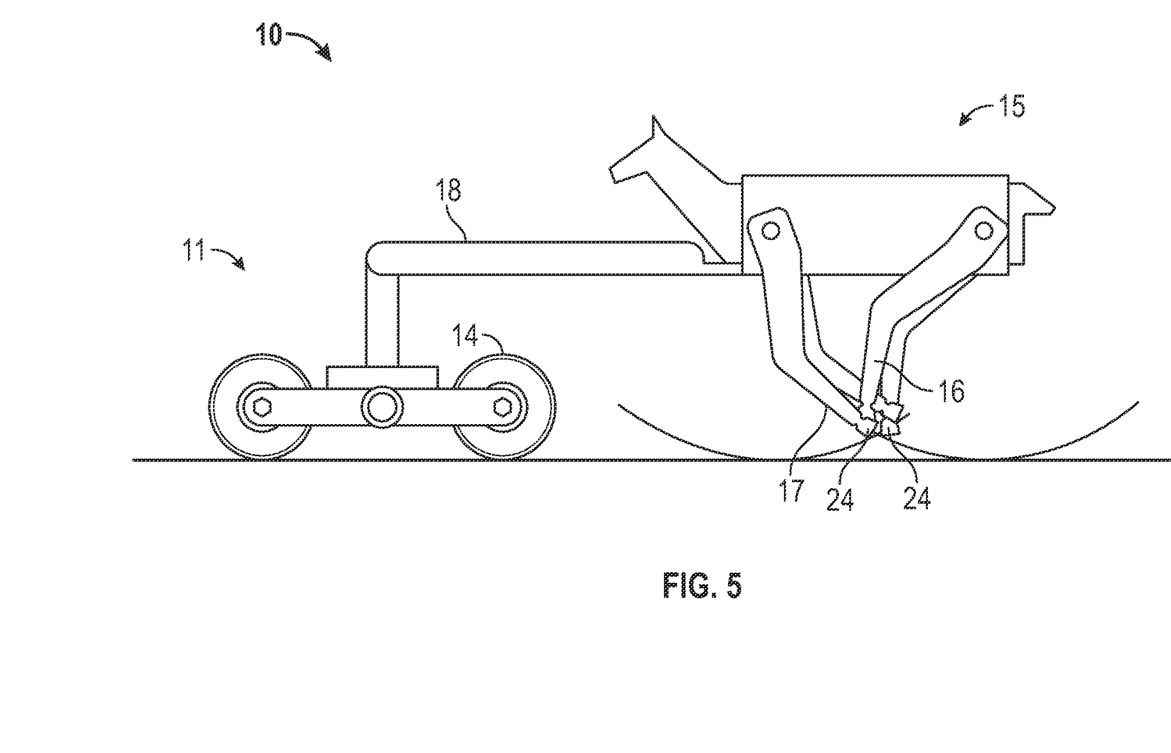
FIG. 5 is a side view of the mechanized training device of FIG. 1 with the rear legs configured to swing in tandem with each other to simulate a "hopping" gate.

FIG. 5 is the roping target of FIG. 4 with the rear legs 16 configured to swing in tandem with each other to simulate a "hopping" gate. Cams (not shown) in the mechanism are provided to cause the roping target 15 to rise vertically to further simulate a realistic action for the user.

Figure 6:
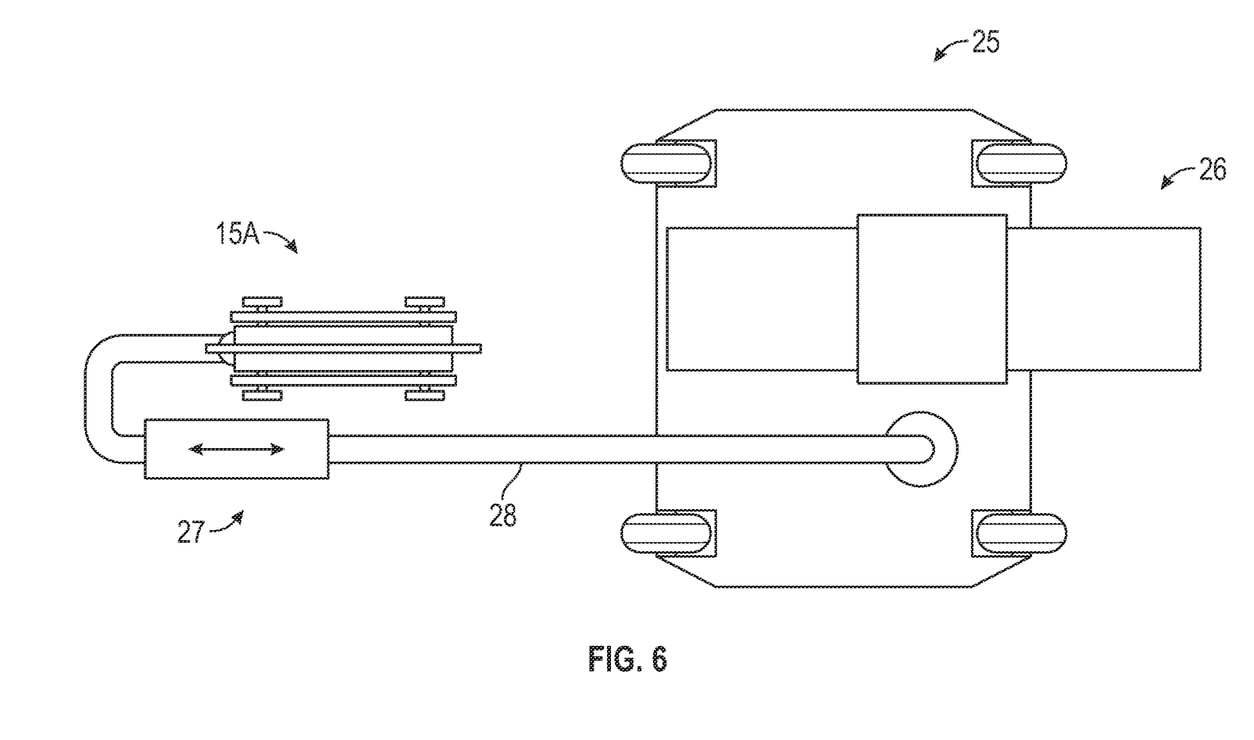
FIG. 6 is a top view of an alternative preferred embodiment of the mechanized training device of the present invention.

FIG. 6 depicts an alternative variation embodiment of the subject invention wherein the roping target 15A does not traverse about a pivot; rather it is propelled by a rider cart 25. The user rides on the rider cart 25 while sitting on a saddle affixed to an articulating horse structure 26. The horse structure simulates the basic relative motion that the user would experience on a horse. The horse simulator motion is independently provided separately from the motor articulating the roping target legs. The rider cart 25 features an extension means 28 cantilevered forward to support the roping target 15A. The extension means 28 includes a proximity adjustor 27 that provides a variable distance between the roping target 15A and the rider cart 25. The proximity adjustor 27 can be set to a desired distance and/or set to provide a programmed random distance.

Figure 7:
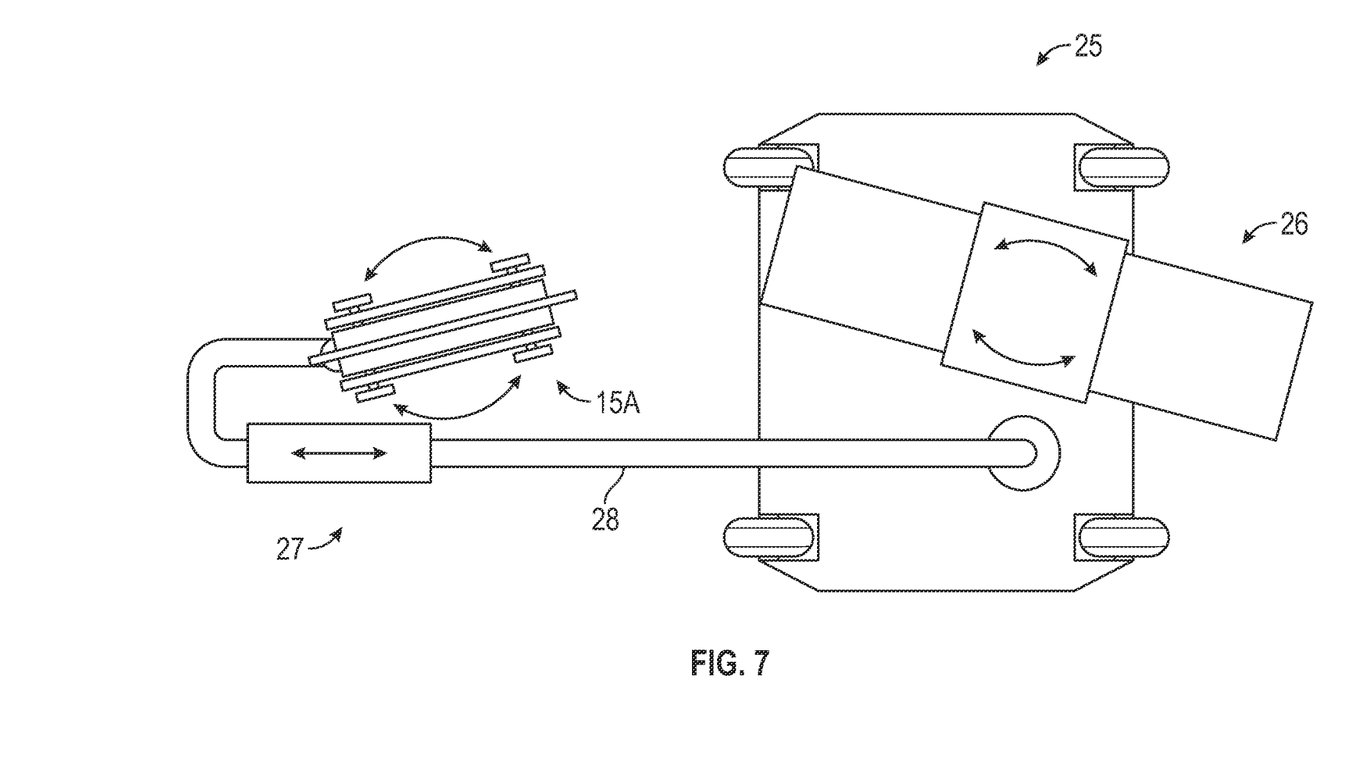
FIG. 7 is a top view of the device of FIG. 6 in a swiveled position.

FIG. 7 shows the embodiment of FIG. 6 wherein the roping target 15A and the horse simulator 26 are shown in a swiveled position. The swivel positions for the roping target 15A and the horse simulator 26 provide approximately 45 degrees clockwise and 45 degrees counterclockwise. The respective swivel motions can be set to swivel freely in response to various forces acting on the system during use. The swivel motions of either component can be programmed for random rotation to provide further levels of training difficulty.

Advantages of the Subject Invention

One advantage of the subject invention is that it provides a means for and method for solo use of the product.

Another advantage of the subject invention is that it provides a roping target similar to a relatively small goat like animal, while other embodiments simulate a relatively large calf like animal.

Another advantage of the subject invention is that it provides a realistic animation of the legs of the roping target by articulating the animation of the front legs in cooperation with the rear legs.

Another advantage of the subject invention is that it provides a roping target with articulated and animated legs with hoofs that effectively touch the ground.

Another advantage of the subject invention is that it provides a means of configuring the animated legs of the roping target to simulate either a hopping gate or a skipping gate.

Another advantage of the subject invention is that it provides a drive means for the articulated legs which is independent of the drive means that moves the roping target through free space.

Another advantage of the subject invention is that it provides a means of independently adjusting the relative motion speed of the roping target legs, while separately providing speed adjustment for a drive means for moving the roping target through free space.

Another advantage of the subject invention is that it provides a means to independently randomly vary the speed of the roping target through free space and/or independently randomly vary the speed of the articulated legs and/or randomly vary the switching of the roping target between skipping and hopping gate patterns.

Another advantage of the subject invention is that it provides a safety system to shut down the device from running over a child, animal, or such that might inadvertently come into the path of the device during use.

Another advantage of the subject invention is that it provides a method to shutoff the articulation of the legs and shutoff the movement of the roping target through free space once the roping target is roped.

Another advantage of the subject invention is that it provides an alternative variation wherein the user can sit upon a cart fitted to receive a saddle after the fashion of a horse to provide further realistic roping simulation scenarios.

Another advantage of the subject invention is that it provides an alternative variation wherein a cart fashioned after the likeness of a horse such that the rider is subjected to articulated motion and sensations similar to that of riding a horse.

Another advantage of the subject invention is that it provides an alternative variation wherein a cart fashioned after the likeness of a horse that is articulated independent of the articulation of the roping target legs and independent of movement of the roping target through free space.

Yet another advantage of the subject invention is that it provides an alternative variation wherein a cart fitted with a horse like seat is able to have a set distance between the rider cart and the roping target, and the distance between the rider cart and the roping target can be randomly established via a programmable controller.

Other advantages and features of the subject invention will be apparent to those skilled in the art without abandoning the spirit of the subject invention, as articulated in the claims.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A mechanized training apparatus for steer roping, comprising:
    a motorized wheeled trolley disposed at the end of a radial and extended outward from a pivot such that the trolley travels in a circuitous path around the pivot,
    an extender from the trolley that connects and holds a roping target comprising a simulated animal torso for roping, including a simulated pair of fore legs, and a simulated pair of rear legs capable of articulating from the motor driving the trolley separately, independently and in cooperation such that the front legs and rear legs can move back and forth in tandem or in opposition relative to each other;
    a programmable mover for the fore legs and rear legs, wherein the legs effectively touch the ground; and a programmable mover for the animal torso, wherein the torso moves through space independent of the movement of the fore legs and rear legs;
    wherein the programmable mover configure to randomly vary the speed of movement of the fore legs and rear legs independent of the speed of the torso through free space, wherein the independently and randomly varying movements of the legs are configured to switch from a skipping gate, wherein one rear leg swings forward while the opposing rear leg swings backward to simulate a skipping gate, to a hopping gate, wherein the rear legs swing in tandem with each other to simulate a hopping gate, and/or from a hopping gate to a skipping gate.

2. The apparatus of claim 1 further comprising a safety shut-off system.

3. The apparatus of claim 1 further comprising a stop for stopping articulation of the legs and movement of the torso once roped.

4. A mechanized training apparatus for steer roping comprising: a programmable motorized roping target comprising
    a simulated animal torso including a simulated pair of fore legs and a simulated pair of rear legs capable of articulating separately, independently and in cooperation such that the front legs and rear legs can move back and forth in tandem or in opposition relative to each other, effectively touching the ground, and wherein the front legs can go in between the back legs and the back legs can go inside the front legs;
    a rider cart with an extender that connects and holds the roping target for pulling the torso through space, moving the torso independent of the articulation of the fore legs and rear legs;
    a programmable mover for the fore legs and rear legs, wherein the legs effectively touch the ground; and a programmable mover for the animal torso, wherein the torso moves through space independent of the movement of the fore legs and rear legs;
    wherein the programmable mover configure to randomly vary the speed of movement of the fore legs and rear legs independent of the speed of the torso through free space, wherein the independently and randomly varying movements of the leas are configured to switch from a skipping gate, wherein one rear lea swim's forward while the opposing rear leg swings backward to simulate a skipping gate, to a hopping gate, wherein the rear legs swing in tandem with each other to simulate a hopping gate, and/or from a hopping gate to a skipping gate.

5. The apparatus of claim 4, wherein the cart simulates a horse.

6. The apparatus of claim 1 wherein the articulating legs have a programmable variant speed enabling the legs to move at a constant speed or at multiple variant speeds.

7. The apparatus of claim 4 wherein the articulating legs have a programmable variant speed enabling the legs to move at a constant speed or at multiple variant speeds.

* * * * *